United States Patent
Stewart et al.

(10) Patent No.: US 10,480,444 B2
(45) Date of Patent: Nov. 19, 2019

(54) THREE STEP CAM DEFAULTING STRATEGY FOR ENGINE POSITION SENSORS

(71) Applicant: GM Global Technology Operations LLC, Detroit, MI (US)

(72) Inventors: Etsuko Stewart, Milford, MI (US); Timothy P. Philippart, Orion, MI (US); Scott T. Feldmann, South Lyon, MI (US); Zhong Li, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 15/603,794

(22) Filed: May 24, 2017

(65) Prior Publication Data

US 2018/0340484 A1  Nov. 29, 2018

(51) Int. Cl.
*F01L 1/14* (2006.01)
*F02D 41/22* (2006.01)
*F01L 13/00* (2006.01)

(52) U.S. Cl.
CPC ....... *F02D 41/222* (2013.01); *F01L 2013/111* (2013.01); *F01L 2013/113* (2013.01)

(58) Field of Classification Search
CPC .... F02D 13/0203; F02D 41/222; F01L 1/047; F01L 13/0036; F01L 2013/111; F01L 2013/113

USPC ................. 123/90.16, 90.18, 90.6
See application file for complete search history.

(56) References Cited

U.S. PATENT DOCUMENTS

| | | | | |
|---|---|---|---|---|
| 8,863,714 B1 * | 10/2014 | Moran | ................ | F01L 13/0036 123/90.18 |
| 9,845,712 B2 * | 12/2017 | Hayden | ................... | F01L 1/047 123/90.18 |
| 10,006,323 B2 * | 6/2018 | Gallon | ................... | F01L 1/047 123/90.18 |

* cited by examiner

*Primary Examiner* — Ching Chang

(57) ABSTRACT

A method is provided for operating a three step camshaft system during engine position sensor fault conditions. The three step camshaft has multiple cam actuators each having an actuator pin. The method includes: disposing multiple camshaft barrels on a camshaft, each barrel having a slot receiving the actuator pin of a cam actuator during camshaft barrel rotation axially displacing each camshaft barrel to a high lift lobe position, a low lift lobe position and an active fuel management (AFM) lobe position; determining if an engine position sensor is in a fault condition; identifying if the fault condition occurs simultaneously with any of the camshaft barrels positioned in the AFM lobe position; energizing selected cam actuators in communication with the camshaft barrels positioned in the AFM lobe position to axially displace the camshaft barrel away from the AFM lobe position and to the low lift lobe position.

10 Claims, 4 Drawing Sheets

THREE STEP CAM DEFAULTING STRATEGY FOR ENGINE POSITION SENSORS

INTRODUCTION

The present disclosure relates to sliding camshaft actuators for variable valve lift (VVL) systems and, more particularly, relates to a system for responding to sensor faults occurring during operation of an automobile vehicle three step cam system.

Internal combustion engines include intake and exhaust valves that can be actuated by cam lobes of at least one camshaft. In some configurations the camshafts are constructed with sliding camshaft assemblies having multiple steps for varying the lift distance of an engine valve. For example, a three-step sliding camshaft may include a high lift cam lobe position for lifting an engine valve to a maximum distance, a low lift cam lobe position for lifting the engine valve below the maximum lift distance, and an active fuel management (AFM) or cylinder deactivated lobe position for operation using fewer than all of the available cylinders for maximizing fuel economy, which may provide a substantially zero lift distance.

At least one sliding camshaft actuator is fixed on an internal combustion engine for changing position between the multiple cam lobes. Multiple actuator pins of at least one camshaft actuator are operative to selectively engage displacement grooves configured on the periphery of camshaft barrels formed on the sliding camshaft assembly. As the camshaft assembly rotates, an individual actuator pin is selected to move into a displacement groove of a camshaft barrel which causes the sliding camshaft assembly to shift into a different position along the camshaft axis.

When a sliding camshaft shifts position, the intake and/or exhaust valves are actuated differently in accordance with the changed cam lobe position, e.g., a sliding camshaft may move from a high lift cam lobe position to a low lift cam lobe position, which in turn will cause the engine operation to be different. Thus, the sliding camshaft actuator is an important component in the proper operation of a sliding camshaft system, particularly the actuator's pin position relative to extending into, and retracting from, the displacement grooves into the camshaft barrels. The actuator's pin position is tracked by a sensing device which outputs a digital signal indicative of the pin position, e.g., a low pulse width modulated duty cycle is indicative of an extended pin position, and a high pulse width modulated duty cycle is indicative of a retracted pin position.

Multiple vehicle sensors are used to monitor and control engine component performance. These include an engine crankshaft sensor, at least one intake cam sensor, and at least one exhaust cam sensor. If one of the sensors faults while the vehicle is operating in the active fuel management (AFM) mode, maximum engine capacity is not available. Thus while it may be undesirable to remain in the AFM mode during a sensor fault condition, the necessary engine position data normally used to change cam position may temporarily not be available.

Thus, while current two-way cam control systems achieve their intended purpose, there is a need for a new and improved system and method for controlling operation of a three step cam system when a sensor fault is occurring.

SUMMARY

According to several aspects, a method for operating a three step camshaft system during engine position sensor fault conditions. The method comprises the steps of: slidably disposing multiple camshaft barrels on a camshaft each having a high lift lobe position, a low lift lobe position and an active fuel management (AFM) lobe position; determining if one of multiple engine position sensors is in a fault condition; and repositioning any of the camshaft barrels positioned in the AFM lobe position during the fault condition to the low lift lobe position.

In another aspect of the present disclosure, the method further includes connecting a cam actuator to each of the multiple camshaft barrels.

In another aspect of the present disclosure, the method further includes individually energizing selected ones of the cam actuators in communication with the camshaft barrels positioned in the AFM lobe position during the repositioning step.

In another aspect of the present disclosure, the method further includes extending an actuator pin of the selected ones of the cam actuators into a slot of one of the camshaft barrels positioned in the AFM lobe position.

In another aspect of the present disclosure, the method further includes if the one of the multiple position sensors defines a crankshaft position sensor a cam back-up mode is entered which performs the repositioning step only once prior to signaling that no further camshaft shifts are permitted until the fault condition is corrected.

In another aspect of the present disclosure, the method further includes issuing a signal blocking further camshaft barrel shifting after the repositioning step until the fault condition is corrected.

In another aspect of the present disclosure, the method further includes prior to the repositioning step identifying if another fault condition is occurring simultaneously with any of the multiple camshaft barrels being positioned in the AFM lobe position.

In another aspect of the present disclosure, the multiple position sensors include a crankshaft position sensor, an intake camshaft position sensor and an exhaust camshaft position sensor.

In another aspect of the present disclosure, the method further includes if the one of the multiple position sensors defines an intake camshaft position sensor or exhaust position sensor fault the repositioning step is conducted applying a signal from a crankshaft sensor providing a nominal crankshaft angle.

In another aspect of the present disclosure, the repositioning step is initiated after a predetermined time delay.

According to several aspects, a method for operating a three step camshaft system during engine position sensor fault conditions, the three step camshaft system having multiple cam actuators each having at least one actuator pin comprises the steps of: slidably disposing multiple camshaft barrels on a camshaft, each of the camshaft barrels having a slot receiving at least one actuator pin of one of the multiple cam actuators during rotation of the camshaft barrels to axially displace the camshaft barrels to individual ones of a high lift lobe position, a low lift lobe position and an active fuel management (AFM) lobe position; determining if one of multiple engine position sensors is in a fault condition; identifying if the fault condition is occurring simultaneously with any of the multiple camshaft barrels being positioned in the AFM lobe position; individually energizing selected ones of the cam actuators in communication with the camshaft barrels positioned in the AFM lobe position to axially displace the camshaft barrel away from the AFM lobe position and to the low lift lobe position.

In another aspect of the present disclosure, the method further includes if the one of multiple position sensors defines a crankshaft position sensor, a controller issues a blocking signal blocking further crankshaft barrel shifting commands using crankshaft position data.

In another aspect of the present disclosure, the method further includes if the one of multiple position sensors defines an intake camshaft position sensor a predefined time delay is imposed prior to conducting the energizing step.

In another aspect of the present disclosure, the method further includes if the one of multiple position sensors defines an exhaust camshaft position sensor a predefined time delay is imposed prior to conducting the energizing step.

In another aspect of the present disclosure, the method further includes if the one of multiple position sensors defines a crankshaft position sensor the energizing step is performed during a first predefined time window.

In another aspect of the present disclosure, the method further includes if the one of multiple position sensors defines an intake camshaft position sensor or an exhaust camshaft position sensor the energizing step is performed during a second predefined time window shorter in duration than the first predefined time window.

In another aspect of the present disclosure, the method further includes initiating the second predefined time window after an initiation time of the first predefined time window.

According to several aspects, a method for operating a three step camshaft system during engine position sensor fault conditions comprises the steps of: providing multiple cam actuators each having at least one actuator pin whose position is sensed using a Hall effect sensor; slidably disposing multiple camshaft barrels on a camshaft, each of the camshaft barrels having a slot receiving at least one actuator pin of one of the multiple cam actuators during rotation of the camshaft barrels to axially displace the camshaft barrels to individual ones of a high lift lobe position, a low lift lobe position and an active fuel management (AFM) lobe position; determining if one of a crankshaft position sensor, an intake camshaft position sensor or an exhaust camshaft position sensor is in a fault condition; identifying if any of the multiple camshaft barrels is positioned in the AFM lobe position; confirming if the fault condition is occurring simultaneously with operation in the AFM lobe position; and individually energizing selected ones of the cam actuators in communication with the camshaft barrels positioned in the AFM lobe position to axially displace the camshaft barrel away from the AFM lobe position and to the low lift lobe position.

In another aspect of the present disclosure, the method further includes limiting the energizing step to a single operation of the cam actuators to force a return to the low lift lobe position.

In another aspect of the present disclosure, the method further includes limiting a time window of the energizing step to a predetermined time window differing in time depending on if the fault condition occurs in the crankshaft position sensor, the intake camshaft position sensor or the exhaust camshaft position sensor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
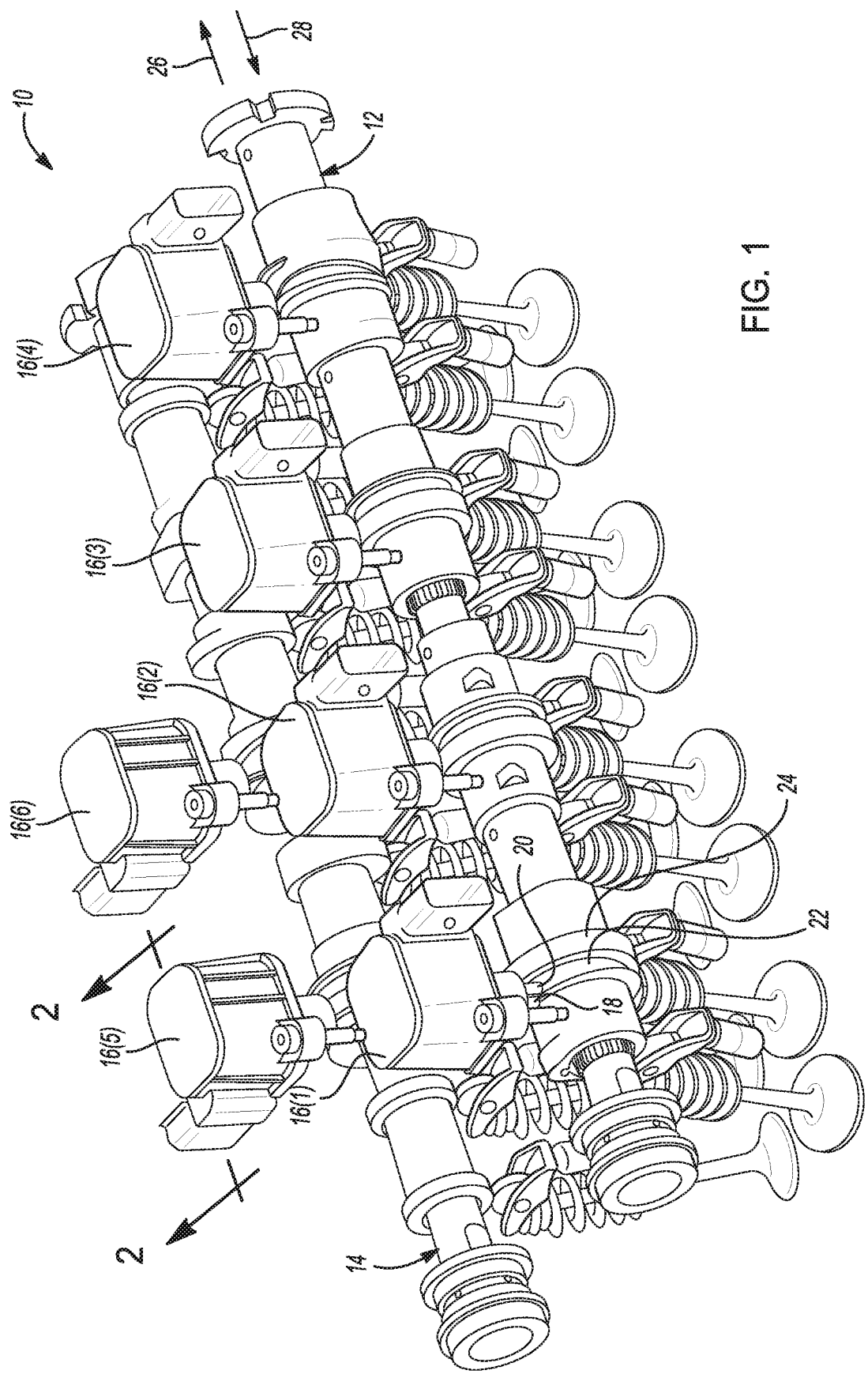
FIG. 1 is partial perspective view of an intake and an exhaust sliding camshaft configuration for a 4 cylinder internal combustion engine in accordance with aspects of an exemplary aspect.

Referring to FIG. 1, an intake and an exhaust sliding camshaft configuration for an exemplary 4 cylinder internal combustion engine camshaft system 10 is provided in accordance with aspects of an exemplary embodiment. It is appreciated that the 4 cylinder embodiment is merely exemplary and the concept of sliding camshaft barrel position sensing may be applied to other multiple cylinder engine camshaft system configurations, e.g., 2, 3, 5, 6, 8, 9, or 12, without exceeding the scope of the invention.

The camshaft system 10 includes at least one sliding camshaft having at least one camshaft barrel. According to several aspects, the camshaft system 10 includes a three (3) step intake sliding camshaft 12 and a two (2) step exhaust sliding camshaft 14. For shifting the position of the three step intake 12 and two step exhaust 14 sliding camshafts, at least one camshaft actuator 16 is provided in selective communication to the camshafts and commanded on and off by a control module, e.g., an engine control module (not shown). Particular to this embodiment, camshaft system 10 includes a plurality of actuators 16(1) to 16(6), with actuators 16(1) to 16(4)) being operative for shifting the three step intake sliding camshaft 12, and actuators 16(5) and 16(6) being operative for shifting the two step exhaust sliding camshaft 14 when commanded by the controller.

Each of the camshaft actuators 16 includes at least one actuation pin, and according to several aspects includes a first actuation pin 18 and a second actuation pin 20, which are individually and selectively extendible and retractable. The first actuation pin 18 and the second actuation pin 20 are individually received in one of multiple slots 22 created in individual ones of multiple camshaft barrels 24 slidably disposed on one of the intake sliding camshaft 12 or the exhaust sliding camshaft 14. Extension of one of the first actuation pin 18 or the second actuation pin 20 during axial rotation of the camshaft causes sliding motion of the camshaft barrel 24 in either a first direction 26 or an opposite second direction 28.

Figure 2:
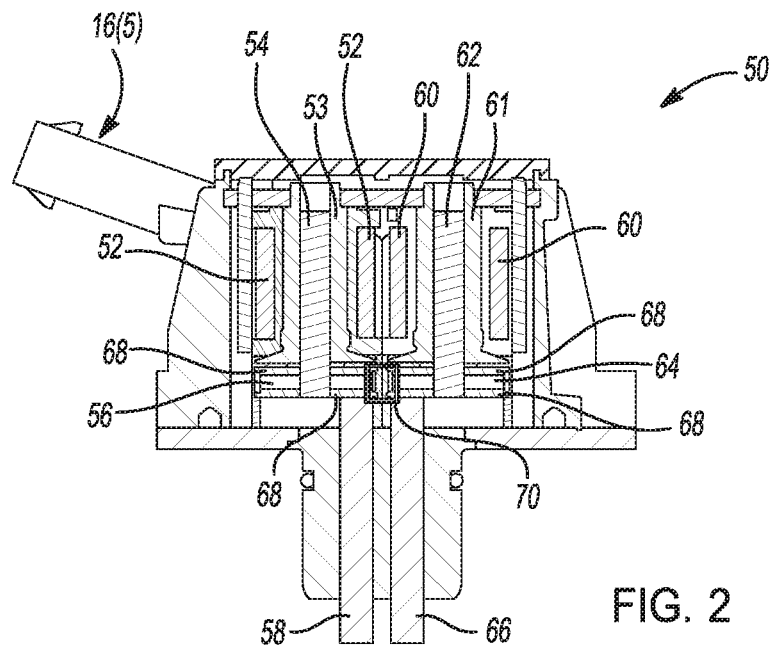
FIG. 2 is a cross sectional front elevational view of a camshaft actuator taken at section 2 of FIG. 1.

Referring now to FIG. 2, a configuration 50 of the exemplary sliding camshaft actuator 16(5) is provided in accordance with aspects of an exemplary embodiment. It is noted that each of the camshaft actuators are substantially identical, therefore the following discussion of the fifth camshaft actuator 16(5) applies equally to the remaining camshaft actuators which will therefore not be further discussed herein. The sliding camshaft actuator 16(5) includes a first magnetic field generating coil 52 wound on a spool 53 that shrouds a sliding armature 54 within its core. A magnet 56 is disposed between metal plates 68 and fixed at a bottom end of the sliding armature 54. The first magnetic field generating coil 52, the sliding armature 54, and magnet 56 are operative to cause a first actuator pin 58 to be extended into a camshaft barrel as necessary for purposes of shifting the position of the three step intake sliding camshaft 12 in accordance with aspects of the exemplary embodiment. A pin position sensing device 70, preferably a Hall Effect sensor, is provided for tracking the position of the actuator pin(s) and outputting a digital signal indicative of the pin position to a control module, i.e., engine control module (not shown).

The sliding camshaft actuator 16(5) also includes a second magnetic field generating coil 60 wound on a spool 61 that shrouds a sliding armature 62 within its core. A magnet 64 is disposed between the metal plates 68 and fixed at a bottom end of the sliding armature 62. The second magnetic field generating coil 60, the sliding armature 62, and the magnet 64 are operative to cause a second actuator pin 66 to be extended into a camshaft barrel as necessary for purposes of shifting the position of the three step intake sliding camshaft 12 in accordance with aspects of the exemplary embodiment.

Figure 3:
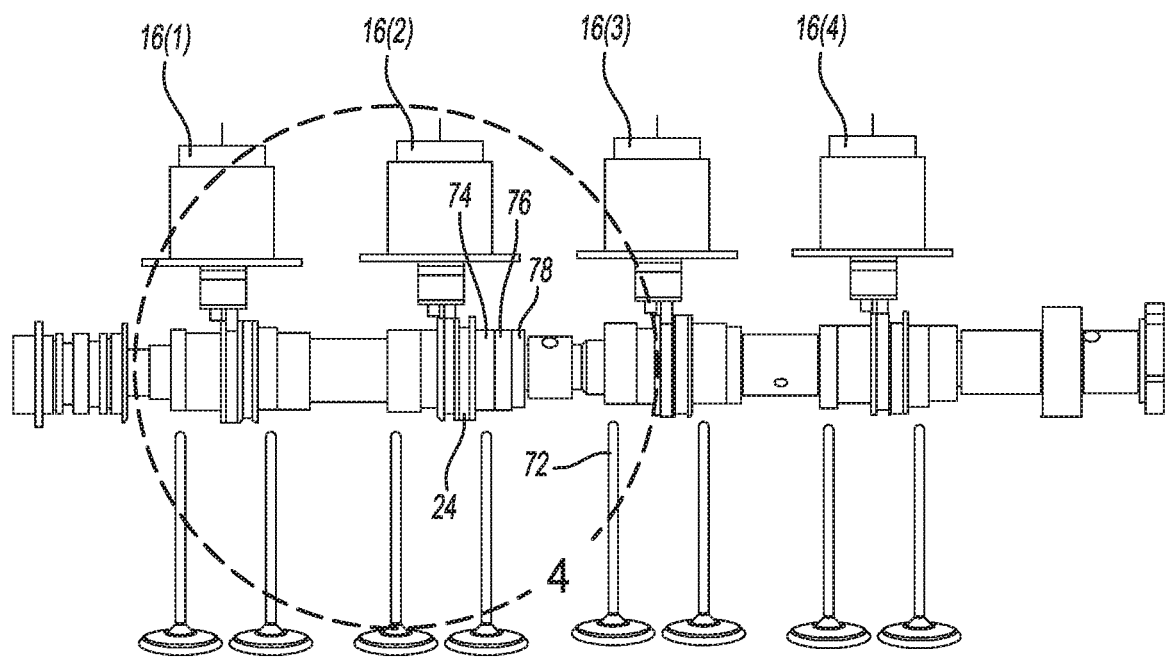
FIG. 3 is a front elevational assembly view of a portion of the intake sliding camshaft configuration of FIG. 1.

Referring to FIG. 3, the 4 intake actuators 16(1), 16(2), 16(3), 16(4) may be used to achieve different combinations of modes. For example, the first and fourth intake actuators 16(1), 16(4) may be used during operation in high lift mode and in low lift mode. The second and third intake actuators 16(2), 16(3) may be used in each of a high lift mode provided at a high lift lobe 74, a low lift mode having less lift than the high lift mode provided at a low lift lobe 76, and an AFM mode having substantially no lift at an AFM lobe 78. For AFM mode operation, half of the cylinders are deactivated and half are activated in low lift mode. The actuators are normally de-energized OFF unless valve lift is commanded to shift, thereby changing mode between the high lift mode, the low lift mode, and the AFM mode. Each mode transition requires two coils to be energized. Depending on the axial position of the camshaft barrels 24, an intake valve such as an exemplary intake valve 72 may contact the high lift lobe 74, the low lift lobe 76, or the AFM or substantially zero lift lobe 78.

Figure 4:
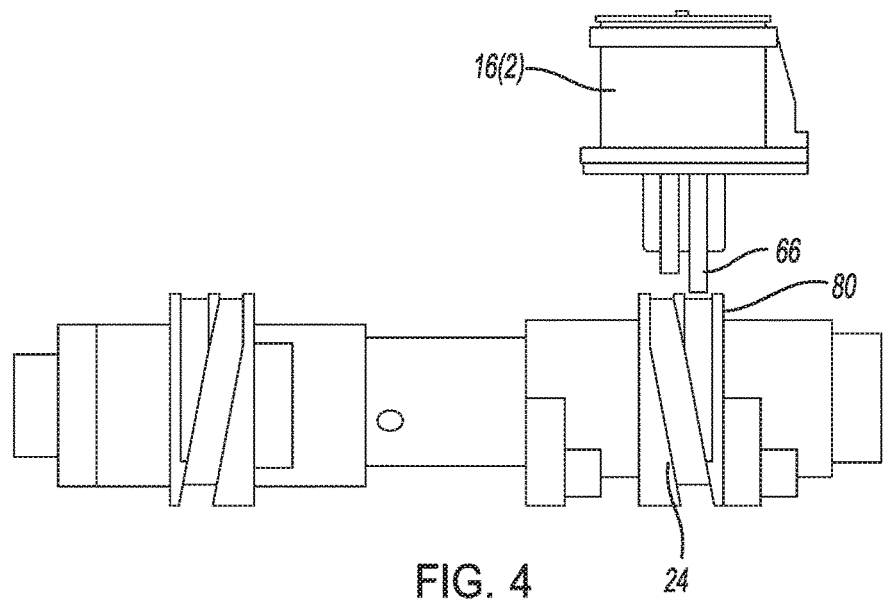
FIG. 4 is a front elevational assembly view of area 4 of FIG. 3.

Referring to FIG. 4 and again to FIGS. 1-3, an extended second actuator pin 66 is shown. Because each of the camshaft barrels 24 are independently displaced by a separate actuator, and each of the actuators provides both first and second pins, if any of the actuator pins such as the second actuator pin 66 is untimely extended, or sticks in the extended position shown, an undesired camshaft barrel displacement can occur. The control system is based on crankshaft position, therefore when a predefined crankshaft position is achieved, a predefined camshaft actuator pin position is desired. If any of the actuator pins is incorrectly positioned, the actuator pin may inadvertently contact a slot shoulder such as a shot shoulder 80 of a camshaft barrel 24 as the camshaft barrel 24 axially translates between different mode positions, or may miss the intended slot of the camshaft barrel 24. Interference with achieving a desired camshaft barrel displacement will thereby result.

Referring to FIG. 5 and again to FIGS. 1-4, during operation of at least one of the engine cylinders in AFM mode, the exemplary intake valve 72 may contact the substantially zero lift lobe 78. To change mode to the low lift mode, the second actuator 16(2) is energized to extend the first actuator pin 58 as shown into alignment with an elongated and pitched slot 82. As the intake sliding camshaft 12 axially rotates, the axially fixed first actuator pin 58 sliding within the slot 82 axially translates the camshaft barrel 24 in the first direction 26. This axial displacement repositions the low lift lobe 76 to be contacted by the intake valve 72. The actuators including the first actuator 16(1) and the second actuator 16(2) are each controlled by signals received from a controller 86. The controller 86 receives input data from multiple sources including at least a crankshaft sensor 88, an intake camshaft position sensor 90 and an exhaust camshaft position sensor 92. The crankshaft sensor 88 provides profile information on engine crankshaft position, the intake camshaft position sensor 90 provides profile information on the at least one intake camshaft position, and the exhaust camshaft position sensor 92 provides profile information on the at least one exhaust camshaft position.

Figure 5:
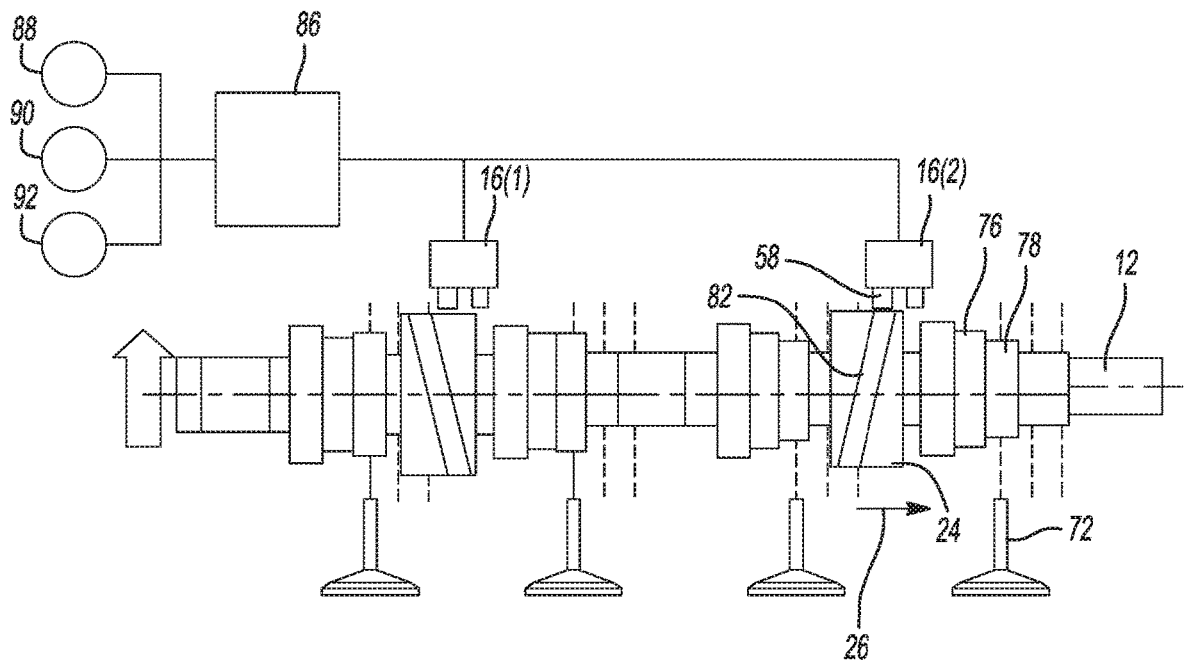
FIG. 5 is a front elevational view of a portion of the intake sliding camshaft configuration of FIG. 1 in communication with a control system.
Figure 6:
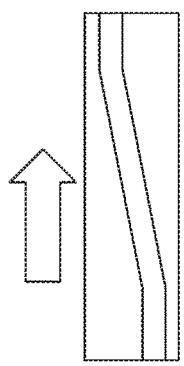
FIG. 6 is a front elevational view of a camshaft barrel in planar view.
Figure 6:
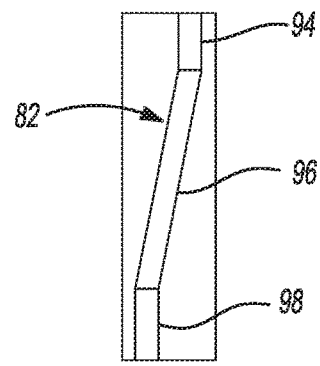

Referring to FIG. 6 and again to FIG. 5, the slot 82 is formed about a circumference of the camshaft barrel 24 and is therefore presented in planar form for clarity. The slot 82 includes a straight first portion 94 which transitions into an angularly directed second portion 96. The second portion 96 transitions into a third portion 98 which is oriented substantially parallel with the first portion 94.

Figure 7:
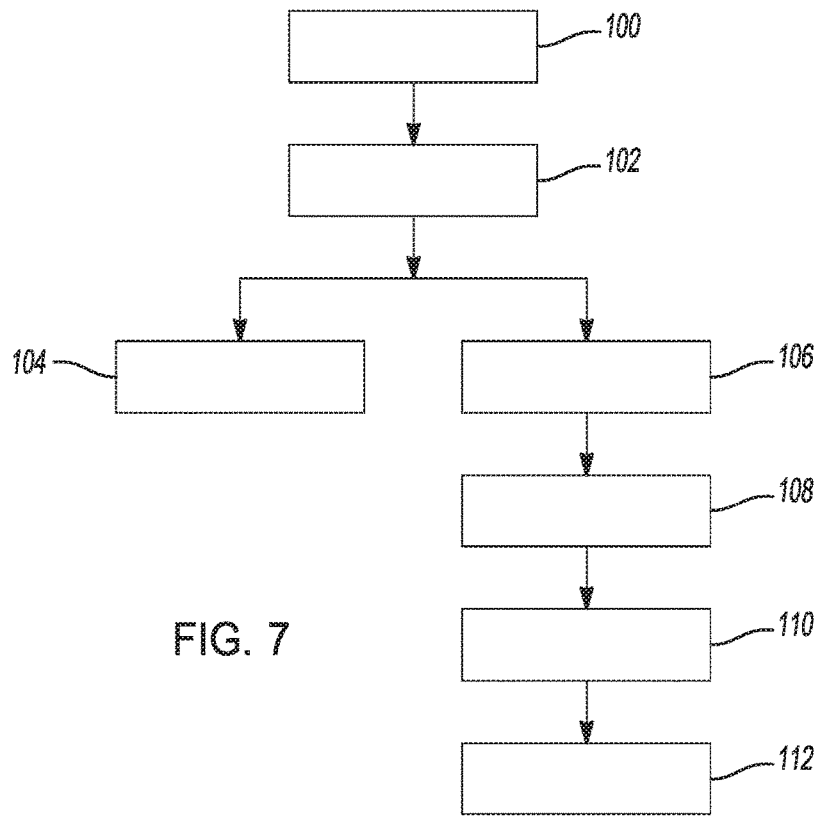
FIG. 7 is a flow diagram of the method for operating a three step camshaft system during engine position sensor default conditions according to an exemplary embodiment.

Referring to FIG. 7 and again to FIGS. 1-6, the steps taken by the controller 86 when a fault condition of the crankshaft sensor 88 occurs are identified. In a first step 100, a crankshaft sensor 88 fault is identified. In a step 102 a mode determination is made to identify if the engine is operating in low lift mode, high lift mode or AFM mode. In a step 104 if the query from step 102 identifies either low lift mode or high lift mode is present, no further action is required and a command is sent to halt further shift commands until the fault of the crankshaft sensor 88 is subsequently corrected and the control recovery ends. The vehicle will continue to be operable in only the present low lift or high lift mode of operation.

In a step 106, if the query from step 102 identifies the engine is presently operating in AFM mode, a cam back-up mode is entered wherein the engine is ordered out of AFM mode and into low lift mode to ensure sufficient engine capacity is available during subsequent operation without availability of accurate crankshaft position. In the cam back-up mode in a step 108 the controller 86 identifies the cylinders presently operating in AFM mode and in a step 110 sends commands to the appropriate controllers for the cylinders presently operating in AFM mode, for example such as to the second actuator 16(2) and to the third actuator 16(3), to shift the crankshaft barrels associated with the AFM mode operating cylinders to the low lift mode positions. After the above commands are sent, in a step 112 a command is sent to halt further shift commands until the fault of the crankshaft sensor 88 is subsequently corrected and the control recovery ends. The vehicle will thereafter continue to operate in low lift mode.

Referring to FIG. 8 and again to FIGS. 1-7, following a crankshaft sensor 88 fault and subsequent identification that the engine is operating in AFM mode, the timing when to fire the pin or pins of the appropriate actuators is as follows. Because accurate crankshaft position is not available from the crankshaft sensor 88, the cam back-up mode provides a single operation of the actuators 16 for the deactivated cylinders to force a return of all cylinders to low lift mode. Because camshaft position is known from the intake camshaft position sensor 90 the pin or pins of the actuators presently in AFM mode of operation, for example the second actuator 16(2) and the third actuator 16(3) are energized to extend their first actuator pin 58 into the straight first portion 94 of the slot 82 at a first initiation time 113. The first initiation time 113 is predetermined to ensure the first actuator pin 58 contacts a surface 114 of the straight first portion 94 of the slot 82. A graph first portion 116 depicts a path of the first actuator pin 58 within the slot 82, while a graph second portion 118 depicts a side elevational view of the travel path of the first actuator pin 58 as the first actuator pin 58 travels in a direction 120.

While the second actuator 16(2) is energized, the first actuator pin further extends as it encounters a pitched portion 122 of the slot 82 to reach a fully extended position (designated as first actuator pin 58') in contact with a slot bottom surface 124. As the camshaft barrel 24 continues to rotate, the extended but laterally fixed position of the first actuator pin 58' continues to relatively displace in the direction 120 until passing through the angularly directed second portion 96 of the slot 82, during which sliding displacement of the camshaft barrel 24 is induced. A predetermined time window 126 during which the second actuator 16(2) is energized ends at a cessation time 128 predetermined to occur when the first actuator pin 58' reaches the end of the angularly directed second portion 96 and enters the third portion 98 of the slot 82.

Once within the third portion 98 of the slot 82, the first actuator pin (now designated first actuator pin 58") contacts a raised ramp 130 forcing the first actuator pin 58" upwardly in a direction 132. The first actuator pin (now designated first actuator pin 58''') is freely returned in the direction 132 by an outward force induced by contact with the raised ramp 130 and releases away from a slot surface 134.

Figure 8:
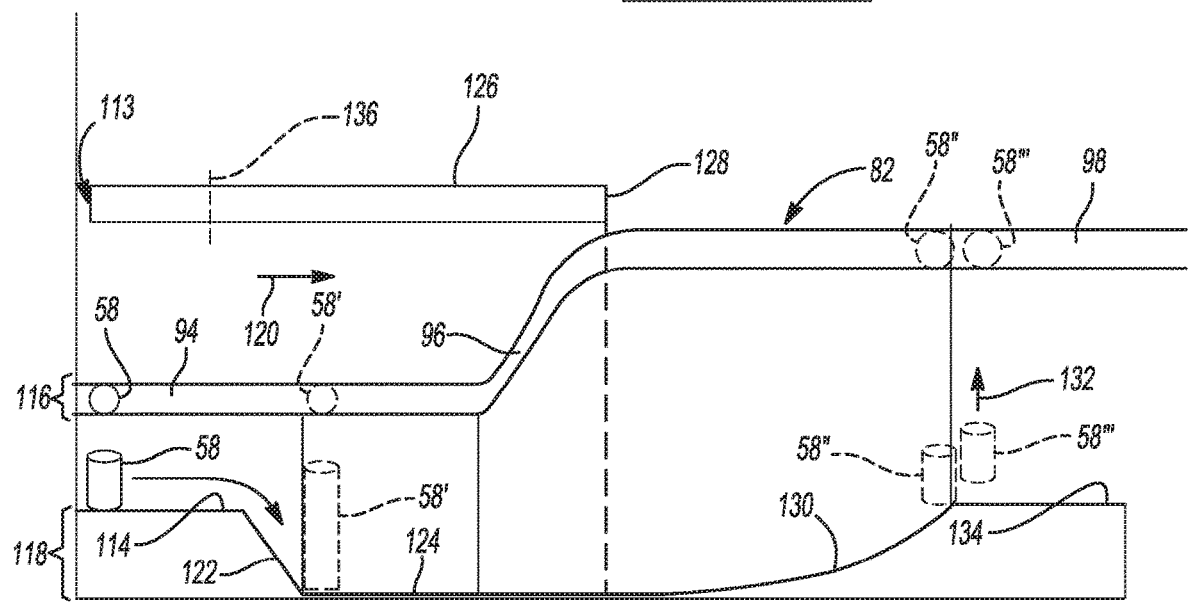
FIG. 8 is a graph of a camshaft barrel and actuator pin assembly according to an exemplary aspect.

With continuing reference to FIG. 8, if a fault occurs in either the intake camshaft position sensor 90 or the exhaust camshaft position sensor 92 while the crankshaft sensor 88 is operational, the response to force the engine out of AFM mode into low lift mode is retained, however the predetermined time window 126 is reduced. The second actuator 16(2) is not energized in these situations until a modified initiation time 136 is reached. The modified initiation time 136 is used because although crankshaft position is still known, an accurate position of the intake camshaft 12 or the exhaust camshaft 14 is not known due to fault of either the intake camshaft position sensor 90 or the exhaust camshaft position sensor 92. To ensure the first actuator pin 58 encounters the surface 114 of the straight first portion 94 of the slot 82 when camshaft position is not accurately known, additional delay time is built into the modified initiation time 136. The cessation time 128 is retained in these scenarios.

A method for operating a three step camshaft system during engine position sensor default conditions of the present disclosure offers several advantages. The method provides steps to quickly identify that a sensor fault is occurring and to shift operation from an active fuel management or cylinder deactivation mode to a low lift mode of engine operation. The method functions with three step camshaft systems having shifting camshaft barrels providing high lift lobes, low lift lobes and AFM lobes.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for operating a camshaft system during engine position sensor fault conditions, the method comprising:
   slidably disposing at least one multiple camshaft barrel on a camshaft, the at least one multiple camshaft barrel being moveable between a high lift lobe position, a low lift lobe position and an active fuel management (AFM) lobe position;
   determining when a crankshaft position sensor is in a fault condition; and
   repositioning the at least one multiple camshaft barrel that is currently positioned in the AFM lobe position during the fault condition to the low lift lobe position.

2. The method of claim 1, wherein repositioning the at least one multiple camshaft barrel that is currently positioned in the AFM lobe position during the fault condition to the low lift lobe position further comprises using a cam actuator for repositioning the at least one multiple camshaft barrel that is currently positioned in the AFM lobe position during the fault condition to the low lift lobe position.

3. The method of claim 2, wherein repositioning the at least one multiple camshaft barrel that is currently positioned in the AFM lobe position during the fault condition to the low lift lobe position further comprises repositioning the at least one multiple camshaft barrel by energizing the cam actuator in communication with the at least one multiple camshaft barrel that is currently positioned in the AFM lobe position during the fault condition to the low lift lobe position.

4. The method of claim 3, further including extending an actuator pin of the cam actuator into a slot of the at least one multiple camshaft barrel positioned in the AFM lobe position.

5. The method of claim 1, further comprising entering a cam back-up mode which repositions the at least one multiple camshaft barrel only once prior to signaling that no further camshaft shifts are permitted until the fault condition is corrected.

6. The method of claim 1, further including issuing a signal blocking further shifting of the at least one multiple camshaft barrel after the repositioning step until the fault condition is corrected.

7. The method of claim 1, further including identifying when the fault condition is occurring simultaneously with the multiple camshaft barrel being positioned in the AFM lobe position.

8. A method for operating a camshaft system for an internal combustion engine, the method comprising:
   providing an internal combustion engine having a controller, a crankshaft position sensor, and a camshaft system having a first camshaft barrel slidingly disposed on a camshaft, the camshaft barrel having a high lift lobe for operating in a high lift mode, a low lift lobe for operating in a low lift mode, an AFM lobe for operating in an AFM mode, and a slot;
   receiving a fault condition indication from the crankshaft position sensor;
   determining which of the high lift mode, the low lift mode, and the AFM mode the internal combustion engine is operating; and ceasing to command a mode change from the controller to the internal combustion engine when the internal combustion engine is operating in one of the high lift mode and the low lift mode.

9. The method of claim 8 further comprising commanding the camshaft system to operate in a low lift mode when the internal combustion engine is operating in the AFM mode.

10. A method for operating a camshaft system for an internal combustion engine, the method comprising:
provifing an internal combustion engine having a controller, a crankshaft position sensor, and a camshaft system having a first camshaft barrel slidingly disposed on a camshaft, the first camshaft barrel having a high lift lobe for operating in a high lift mode, a low lift lobe for operating in a low lift mode, an AFM lobe for operating in an AFM mode, and a slot;
receiving a fault condition indication from the crankshaft position sensor;
determining which of the high lift mode, the low lift mode, and the AFM mode the internal combustion engine is operating;
ceasing to command a mode changes from the controller to the internal combustion engine when the internal combustion engine is operating in one of the high lift mode and the low lift mode; and
commanding the camshaft system to operate in the low lift mode when the internal combustion engine is operating in the AFM mode.

* * * * *